United States Patent
Wirola et al.

(10) Patent No.: US 10,180,488 B2
(45) Date of Patent: Jan. 15, 2019

(54) POSITIONING PERFORMANCE

(71) Applicant: HERE GLOBAL B.V., Eindhoven (NL)

(72) Inventors: Lauri Aarne Johannes Wirola, Tampere (FI); Jari Tapani Syrjärinne, Tampere (FI); Jyrki Ilmari Aarnos, Kangasala (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/586,457

(22) Filed: May 4, 2017

(65) Prior Publication Data
US 2017/0325070 A1 Nov. 9, 2017

(30) Foreign Application Priority Data
May 6, 2016 (GB) .................................. 1607915.4

(51) Int. Cl.
*G01S 5/02* (2010.01)
*H04W 4/029* (2018.01)
*H04W 4/80* (2018.01)

(52) U.S. Cl.
CPC ............ *G01S 5/021* (2013.01); *G01S 5/0252* (2013.01); *H04W 4/029* (2018.02); *H04W 4/80* (2018.02)

(58) Field of Classification Search
CPC ....... H04W 4/028; H04W 4/008; H04W 4/80; H04W 4/029; G01S 5/021; G01S 5/0252
See application file for complete search history.

(56) References Cited

U.S. PATENT DOCUMENTS 8,559,975 B2   10/2013   Lin et al.
9,008,685 B1 *  4/2015   Gold ..................... H04W 72/08
                                              455/456.1

(Continued)

FOREIGN PATENT DOCUMENTS

GB          2499889         9/2013
WO    WO 2014/198898 A2    12/2014
WO    WO 2015/097481        7/2015

OTHER PUBLICATIONS

Eisa, S. et al., *Removing Useless APs and Fingerprints from WiFi Indoor Positioning Radio Maps*, International Conference on Indoor Positioning and Indoor Navigation, IEEE, Oct. 2013, 7 pages.

(Continued)

*Primary Examiner* — Mehmood B. Khan
(74) *Attorney, Agent, or Firm* — Alston & Bird LLP

(57) ABSTRACT

An apparatus obtains test data, which comprises radio samples with associated indications of reference locations. The apparatus estimates for each of a plurality of representations of a radio environment positions based on the radio samples of the test data and on the respective representation. Each representation has been generated based on a different selection of batches of fingerprint. Each fingerprint comprises a radio sample and an indication of a location of measurement. Each radio sample includes a characteristic of a radio signal transmitted by at least one beacon and an identification of the respective beacon. The apparatus determines for each representation a positioning performance by comparing the estimated positions with the reference locations. Based on the determined positioning performances, the apparatus determines whether any batch of fingerprints is to be excluded from further use and/or which representation is to be used as a valid representation of the radio environment.

18 Claims, 6 Drawing Sheets

(56) References Cited

U.S. PATENT DOCUMENTS

| | | | |
|---|---|---|---|
| 9,983,291 B2* | 5/2018 | Do | G01S 5/0226 |
| 2005/0040968 A1* | 2/2005 | Damarla | G01S 5/0252 |
| | | | 340/5.53 |
| 2007/0087761 A1* | 4/2007 | Anjum | G01S 5/0252 |
| | | | 455/456.2 |
| 2011/0286437 A1* | 11/2011 | Austin | H04W 4/02 |
| | | | 370/338 |
| 2013/0018826 A1* | 1/2013 | Sundararajan | H04L 12/6418 |
| | | | 706/12 |
| 2013/0189953 A1* | 7/2013 | Mathews | H04W 12/06 |
| | | | 455/411 |
| 2014/0018095 A1* | 1/2014 | Parvizi | H04W 4/025 |
| | | | 455/456.1 |
| 2014/0051439 A1* | 2/2014 | Brownworth | H04W 60/005 |
| | | | 455/435.1 |
| 2014/0295884 A1* | 10/2014 | Racz | H04W 24/00 |
| | | | 455/456.1 |
| 2015/0031308 A1* | 1/2015 | Schmidt | H04W 4/70 |
| | | | 455/67.11 |
| 2015/0119031 A1* | 4/2015 | Brownworth | H04W 60/005 |
| | | | 455/435.1 |
| 2015/0256972 A1* | 9/2015 | Markhovsky | H04W 4/90 |
| | | | 455/456.1 |
| 2016/0127931 A1* | 5/2016 | Baxley | G01S 5/0263 |
| | | | 455/67.16 |
| 2016/0128018 A1* | 5/2016 | Atreya | H04W 64/00 |
| | | | 455/456.2 |
| 2017/0026798 A1* | 1/2017 | Prevatt | H04W 4/023 |
| 2017/0289768 A1* | 10/2017 | Wan | H04W 4/70 |

OTHER PUBLICATIONS

Combined Search and Examination Report for Great Britain Application No. GB1607915.4 dated Sep. 1, 2016, 11 pages.

Extended European Search Report from corresponding European Patent Application No. 17168186.9 dated Sep. 8, 2017, 11 pages.

* cited by examiner

POSITIONING PERFORMANCE

CROSS-REFERENCE TO RELATED APPLICATIONS

This application claims priority to GB Application No. 1607915.4, filed May 6, 2016, the entire contents of which are incorporated herein by reference.

FIELD OF THE DISCLOSURE

The invention relates to the field of positioning and more specifically to improving the performance of a positioning that is based on representations of a radio environment of a particular site.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from a radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. A crowd-sourcing based training stage may enable an exhaustive survey of a site, for instance all floors, spaces and rooms of a building, in a short time at limited costs. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

For a first aspect of the invention, an example embodiment of a method comprises obtaining test data collected on a test track at a particular site, the test data comprising a plurality of radio samples and for each radio sample an indication of a reference location, each radio sample including at least one characteristic of at least one radio signal transmitted by at least one beacon and measured by a mobile device at the indicated reference location and an identification of the at least one beacon. The method further comprises estimating for each of a plurality of representations of a radio environment for the particular site positions on the test track based on the plurality of radio samples of the test data and on the respective representation of the radio environment, wherein each of the plurality of representations of the radio environment has been generated based on a different selection of a plurality of batches of fingerprints, wherein each fingerprint comprises a radio sample and for each radio sample an indication of a location of measurement, and wherein each radio sample of a fingerprint includes at least one characteristic of at least one radio signal transmitted by at least one beacon and measured by a mobile device at the indicated location of measurement and an identification of the at least one beacon. The method further comprises determining for each of the plurality of representations of the radio environment a positioning performance by comparing the positions estimated for the respective representation of the radio environment with the reference locations. The method further comprises determining, based on the determined positioning performances, whether one or more of the plurality of batches of fingerprints are to be excluded as a basis for a generation of representations of the radio environment for positioning purposes and/or selecting a representation of the radio environment resulting in a best positioning performance as a currently valid representation of the radio environment for the particular site.

For a second aspect of the invention, an example embodiment of a method comprises entering a survey mode or a test mode. The method further comprises determining locations of a mobile device. The method further comprises performing measurements on radio signals at each of the determined locations to obtain radio samples, each radio sample including at least one characteristic of at least one radio signal transmitted by at least one beacon and measured at the indicated location and an identification of the at least one beacon. In a survey mode, the method further comprises assembling a batch of fingerprints, wherein each fingerprint comprises a radio sample collected during a survey of a particular site and for each radio sample an indication of a determined location as a location of measurement, and transmitting the batch of fingerprints to a server as a basis for generating a representation of a radio environment at the site. In a test mode, the method further comprises assembling test data, wherein the test data comprises radio samples collected on a test track and for each radio sample an indication of a determined location as a reference location, and transmitting the test data to a server as a basis for enabling the server to determine which batches of fingerprints of a plurality of batches of fingerprints provided by at least one mobile device are to be used in the generation of the representation of the radio environment at the site.

An example embodiment of a first apparatus for each aspect of the invention comprises means for causing performance of the actions of any embodiment of the example method presented for the first aspect or the second aspect.

The means of the first apparatus for each aspect of the invention may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second apparatus for the first aspect or the second aspect of the invention comprises at least one processor and at least one memory including computer program code, the at least one memory and the computer program code configured to, with the at least one processor, cause a device at least to perform the actions of any embodiment of the example method presented for the first aspect or the second aspect.

Any of the described apparatuses may comprise only the indicated components or one or more additional components.

Moreover an example embodiment of a system is presented, which comprises an apparatus according to the first aspect, for instance in the form of a server, and at least one further component. Such a further component may be for instance a memory that is accessible to the apparatus. Such a further component may be for instance another apparatus, for instance another server, generating the representations of a radio environment and providing corresponding data to the apparatus according to the first aspect. Such a further component may be for instance at last one mobile device collecting the test data and/or at last one mobile device providing fingerprints.

Moreover an example embodiment of a non-transitory computer readable storage medium, in which computer program code is stored, is presented for the first and second aspect of the invention. The computer program code causes a device to perform the actions of any embodiment of the example method presented for the first aspect or the second aspect when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention according to the first aspect or the second aspect, respectively, as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for improving a positioning performance. In certain embodiment, any of the presented apparatuses is an apparatus for improving a positioning performance.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
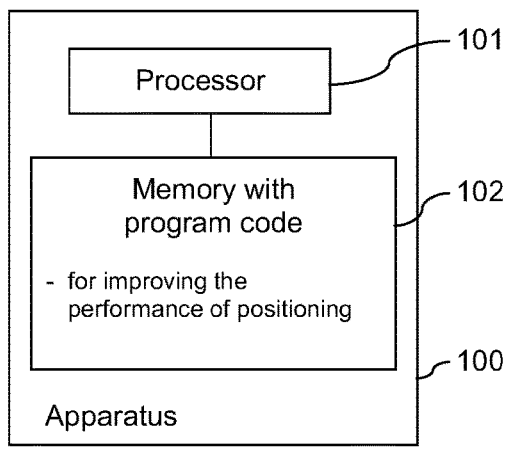
FIG. 1 is a schematic block diagram of an example embodiment of an apparatus according to the first aspect.

FIG. 1 is a schematic block diagram of an example embodiment of an apparatus 100 according to the first aspect of the invention. Apparatus 100 comprises a processor 101 and, linked to processor 101, a memory 102. Memory 102 stores computer program code for improving a performance of a positioning that is based on a representation of a radio environment at a particular site. The computer program code may be example computer program code according to the first aspect of the invention, and memory 102 may be an example computer readable medium according to the first aspect of the invention. Processor 101 is configured to execute computer program code stored in memory 102 in order to cause an apparatus to perform desired actions.

Apparatus 100 may be a mobile device, like a mobile communication device, or a stationary device, like a server, or any kind of positioning support device. A mobile device is configured to enable operation while the device is moving. A stationary device is configured to be stationary when in operation and/or fixed to a particular location. A stationary device may be ground based and thus stationary with respect to Earth or only stationary within a particular environment, like a ship. Apparatus 100 may equally be a module, like a chip, circuitry on a chip or a plug-in board, for a device. Optionally, apparatus 100 may comprise various other components, like a data interface, a user interface, a further memory, a further processor, etc.

An example operation of apparatus 100 will now be described with reference to the flow chart of FIG. 2. The operation is an example embodiment of a method according to the first aspect of the invention. Processor 101 and the program code stored in memory 102 cause a device to perform the operation when program code is retrieved from memory 102 and executed by processor 101. The device that is caused to perform the operation may be apparatus 100 or some other device, for example but not necessarily a device comprising apparatus 100.

The device obtains test data collected on a test track at a particular site. The test data comprises a plurality of radio samples and for each radio sample an indication of a reference location. Each radio sample includes at least one characteristic of at least one radio signal transmitted by at least one beacon and measured by a mobile device at the indicated reference location and an identification of the at least one beacon. (action 201) The test data may be obtained for instance from a receiver of the device receiving the test data directly or indirectly from the mobile device, or from a memory, where it was previously stored. The test track may be for instance a route that a user of the mobile device took at the particular site while the mobile device collected the test data.

The device furthermore estimates for each of a plurality of representations of a radio environment for the particular site positions on the test track based on the plurality of radio samples of the test data and on the respective representation of the radio environment. Each of the plurality of representations of the radio environment has been generated based on a different selection of a plurality of batches of fingerprints. Each fingerprint comprises a radio sample and for each radio sample an indication of a location of measurement. Each radio sample of a fingerprint includes at least one characteristic of at least one radio signal transmitted by at least one beacon and measured by a mobile device at the indicated location of measurement and an identification of the at least one beacon. (action 202) The radio samples in the plurality of batches of fingerprints may have been collected by one or more mobile devices. The mobile device collecting the test data of action 201 may optionally be one of these mobile devices. A representation of a radio environment may be any kind of data that allows determining characteristics of radio signals that may be expected to be observed at different geographic locations of a localization site.

The device furthermore determines for each of the plurality of representations of the radio environment a positioning performance by comparing the positions estimated for the respective representation of the radio environment with the reference locations. (action 203)

The device furthermore determines, based on the determined positioning performances, whether one or more of the plurality of batches of fingerprints are to be excluded as a basis for a generation of representations of the radio environment for positioning purposes. Alternatively or in addition, the apparatus selects a representation of the radio environment resulting in the best positioning performance as a currently valid representation of the radio environment for the particular site. (action 204)

In general, a quality of a representation of a radio environment that is determined based on fingerprints increases with the amount of available data. The invention proceeds from the consideration that some data collected in crowdsourcing may not contributed favorably to the positioning performance, though. Occasionally, it may happen that some fingerprint data is flawed, for instance due to an error of the user of the device collecting the data, or that the device used in the data collection has a sub-optimal hardware for the survey purposes. Fingerprints are usually provided in batches, where each batch may comprise for instance the fingerprints that have been collected by a particular survey device at a particular occasion for a particular site. However, when e.g. tens or even hundreds of fingerprint batches are available for generating a representation of a radio environment, it is impossible to manually analyze the data and exclude bad data from the generation.

Certain embodiments of the invention therefore provide that a test track is used for determining for some or all available batches of fingerprints for a site, whether they deteriorate the positioning performance. Representations of a radio environment are determined with and without a certain batch. Test data comprises reference locations of a test track at the site and the results of radio measurements at each of these reference locations. It may be determined how well the reference locations on the test track may be estimated based on the results of the radio measurements of the test data and each representation of the radio environment. Only batches that have no negative effect on the positioning performance that may be achieved with the representations may be used as a basis for current and future representations of the radio environments.

Certain embodiments of the invention may have the effect that they enable an improvement of the positioning performance that may be achieved with fingerprint based representations of radio environments. Certain embodiments of the invention may have the effect that they enable an automatic analysis of collected data for the improvement.

Figure 2:
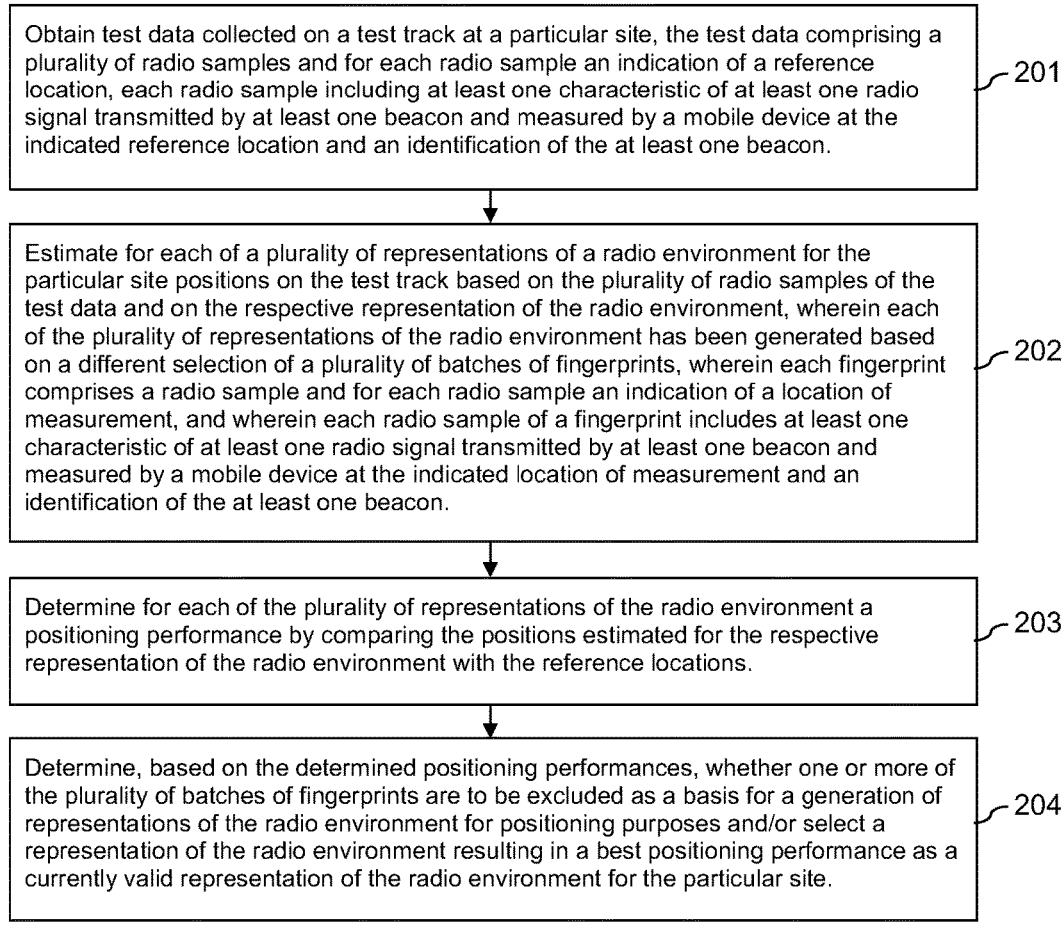
FIG. 2 is a flow chart illustrating an example embodiment of a method according to the first aspect.

Apparatus 100 illustrated in FIG. 1 and the method illustrated in FIG. 2 may be implemented and refined in various ways.

The site may be an indoor site, but it may equally be an outdoor site or comprise outdoor areas.

In example embodiments, estimating positions comprises estimating first positions based on the plurality of radio samples of the test data and on a first representation of the radio environment that has been generated based on a first set of batches of fingerprints, and estimating at least second positions based on the plurality of radio samples and on a second representation of the radio environment that has been generated based on a second set of at least one batch of fingerprints. The first set of batches of fingerprints may comprise at least one batch that has been excluded from the second set of at least one batch of fingerprints. Determining whether one or more of the plurality of batches of fingerprints are to be excluded as a basis for a generation of representations of the radio environment for positioning purposes and/or selecting a representation of the radio environment resulting in a best positioning performance as the currently valid representation of the radio environment may then comprise determining whether the positioning performance resulting with the second representation of the radio environment is improved compared to the positioning performance resulting with the first representation of the radio environment. In case the positioning performance resulting with the second representation of the radio environment is determined to be improved compared to the positioning performance resulting with the first representation of the radio environment, the at least one batch that has been excluded from the second set of at least one batch of fingerprints is excluded as a basis for a generation of representations of the radio environment for positioning purposes and/or excluding the first representation of the radio environment from being used as the currently valid representation of the radio environment. This may have the effect that batches that potentially deteriorate the positioning performance can easily be identified and excluded from further consideration.

In example embodiments, the plurality of representations of the radio environment comprises representations of the radio environment that have been generated based on each possible combination of a plurality of available batches of fingerprints. This may have the effect that the best combination of batches in terms of achievable positioning performance can be determined.

In order to reduce the processing load, the comparison of positioning performances may also be implemented in various other ways.

For example, a first representation of the radio environment that is generated based on all available batches for a site may be compared with each of a plurality of second representations of the radio environment that are generated based on all available batches except for respectively one. Alternatively, the first representation of the radio environment could be replaced by the respective second representation, if it is determined that a batch omitted in the generation of the second representation should be omitted permanently, and the process could be repeated with a second representation that is generated based on all batches used for the new first representation except for one. This may have the effect that the processing load for the respective second representation may be lowered.

In example embodiments, the plurality of representations of the radio environment comprises representations of the radio environment that have been generated based on sets of batches, in which at least one batch of the plurality of batches has been excluded randomly. In example embodiments, the plurality of representations of the radio environment comprise representations of the radio environment that have been generated based on sets of batches, in which at least one batch of the plurality of batches has been excluded based on a priori knowledge. Such a priori knowledge may be available for instance from previous analysis rounds. The use of a priori knowledge may be suited to reduce the required processing time for the analysis.

In example embodiments, a respective batch of fingerprints comprises radio samples collected by a single mobile device. That is, in these embodiments, fingerprints from different mobile devices are generally included in different batches of fingerprints. This may have the effect that the evaluation of the quality of a batch may give information on the quality of fingerprints that may be expected from a particular device or from a particular device model. The batches may be received directly the mobile device collecting the data for the batch or from some intermediate device. Some devices may be identified for instance by means of an International Mobile Equipment Identity (IMEI), which also provides an indication of the type of device. Such an identification may be included for example in the fingerprints or in data associated with a batch of fingerprints.

Information on mobile devices that previously provided batches that have been excluded from consideration may be used for example as a priori knowledge. Information on models of mobile devices that previously provided batches that have been excluded from consideration with a certain frequency may equally be used for example as a priori knowledge. It is to be understood that collection of such a priori knowledge on devices and device models may not be confined to a particular site, but could also be collected and considered for several sites in common.

In example embodiments, mobile devices may be determined which provided batches of fingerprints that are to be excluded from being used as a basis for generating representations of the radio environment for positioning purposes and/or that were not included as a basis for generating a representation of the radio environment selected as the currently valid representation of the radio environment for the particular site. Based on the determination, a recommendation may be provided whether a mobile device is to be used for future collection of fingerprints. Alternatively or in addition, information about the determined devices may be used as a priori knowledge for subsequent generations of a plurality of representations of the radio environment based on a different selection of a plurality of batches of fingerprints.

Similarly, device models of mobile devices may be determined which provided batches of fingerprints that are to be excluded from being used as a basis for generating representations of the radio environment for positioning purposes and/or that were not included as a basis for generating a representation of the radio environment selected as the currently valid representation of the radio environment for the particular site. The number of such excluded batches per device model may be captured statistically, for instance. Based on the determination, a recommendation may be provided whether a mobile device of a particular device model is to be used for future collection of fingerprints. Alternatively or in addition, information about the determined device models may be used as a priori knowledge for subsequent generations of a plurality of representations of the radio environment based on a different selection of a plurality of batches of fingerprints.

In example embodiments, the positioning performance relates to an accuracy of positioning. An accuracy of positioning may be an accuracy of estimated positions compared to the reference locations. In example embodiments, the positioning performance relates to an availability of positioning. An availability of positioning may indicate a percentage of radio samples of the test data for which a position could be estimated with the respectively employed representation of the radio environment. In example embodiments, the positioning performance relates to a consistency of positioning. A consistency of positioning may indicate a percentage of the reference locations lying within an uncertainty area estimated for the estimated positions. It is to be understood that the positioning performance may also be for example any combination of these criteria.

In example embodiments, the at least one characteristic of a radio signal comprises an indication of a received signal strength of the radio signal. Using received signal strength related values as a characteristic of radio signals may have the effect that such values may be determined for transmissions of any kind of beacon. It may further have the effect that they may be measured at a receiving end without establishing any connection with the transmitting end. An indication of a received signal strength of a radio signal may be for instance a received signal strength indication (RSSI) or a physical Rx level in dBm with a reference value of 1 mW, etc. Another kind of indication of a received signal strength of a radio signal may be for instance an indication of a path loss of a radio signal at a particular location. Other possible characteristics may comprise a timing advance (TA) value or a round-trip time value.

The at least one beacon may comprise any kind of terrestrial transmitter, in particular, though not exclusively, any kind of non-cellular terrestrial transmitter. In example embodiments, the at least one beacon comprises a wireless local area network access point and/or a Bluetooth beacon and/or a Bluetooth beacon enabling Bluetooth low energy mode and/or a Bluetooth low energy beacon. It is to be understood that in some embodiments, characteristics of radio signals from different types of beacons on the site may be considered.

WLAN access points and Bluetooth beacons are already installed in many buildings. Furthermore, WLAN and Bluetooth technologies are supported by many mobile user devices by default, like by most smartphones, tablets, laptops and feature phones. Using characteristics of signals transmitted by WLAN access points, Bluetooth beacons and/or BLE beacons may thus have the effect that the supported positioning may be based in some embodiments on an existing infrastructure in buildings and/or on existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The beacons may be stand-alone devices or be integrated into or attached to some other device. The use of Bluetooth low energy may enable a positioning with limited energy consumption at all involved devices. A Bluetooth beacon that is employed for the invention may be any kind of Bluetooth beacon complying with any present or future standard.

It is to be understood, however, that other types of beacons than variations of WLAN access points or Bluetooth beacons may be used as well, for instance tags or other devices that are configured to transmit ultra-wideband (UWB) signals or ultra-sound signals or any wireless signals that might emerge in the future.

If the at least one beacon comprises alternatively or in addition a cellular transmitter, any of the at least one beacon may be for instance a base station of a Global System for Mobile Communications (GSM) network, of a CDMA2000 network, of a Universal Mobile Telecommunications System (UMTS) network, of a long term evolution (LTE) network, or of any other current or future kind of cellular network.

A representation of a radio environment may be for instance a grid based radio map indicating for each grid point characteristics of radio signals that may be expected to be observed from identified beacons at a geographic location corresponding to the grid point. Using grid based radio maps as representations of the radio environment may have the effect that the data may reflect details of the real radio environment particularly well.

Alternatively, a representation of a radio environment may comprise for instance parameter values of a set of parametric radio models for radio signals transmitted by beacons at the localization site. Using parameter values of parametric radio models may have the effect that the required amount of data for defining the radio environment of a site may be particularly small. The radio models may model any characteristic of radio signals transmitted by a beacon at various locations. An example of a parametric radio model is a path loss model for radio signals transmitted by a beacon. In this case, the parameters may comprise an identification of the beacon, a location of the beacon, a path loss exponent and an indication of a transmission power used by the beacon.

Figure 3:
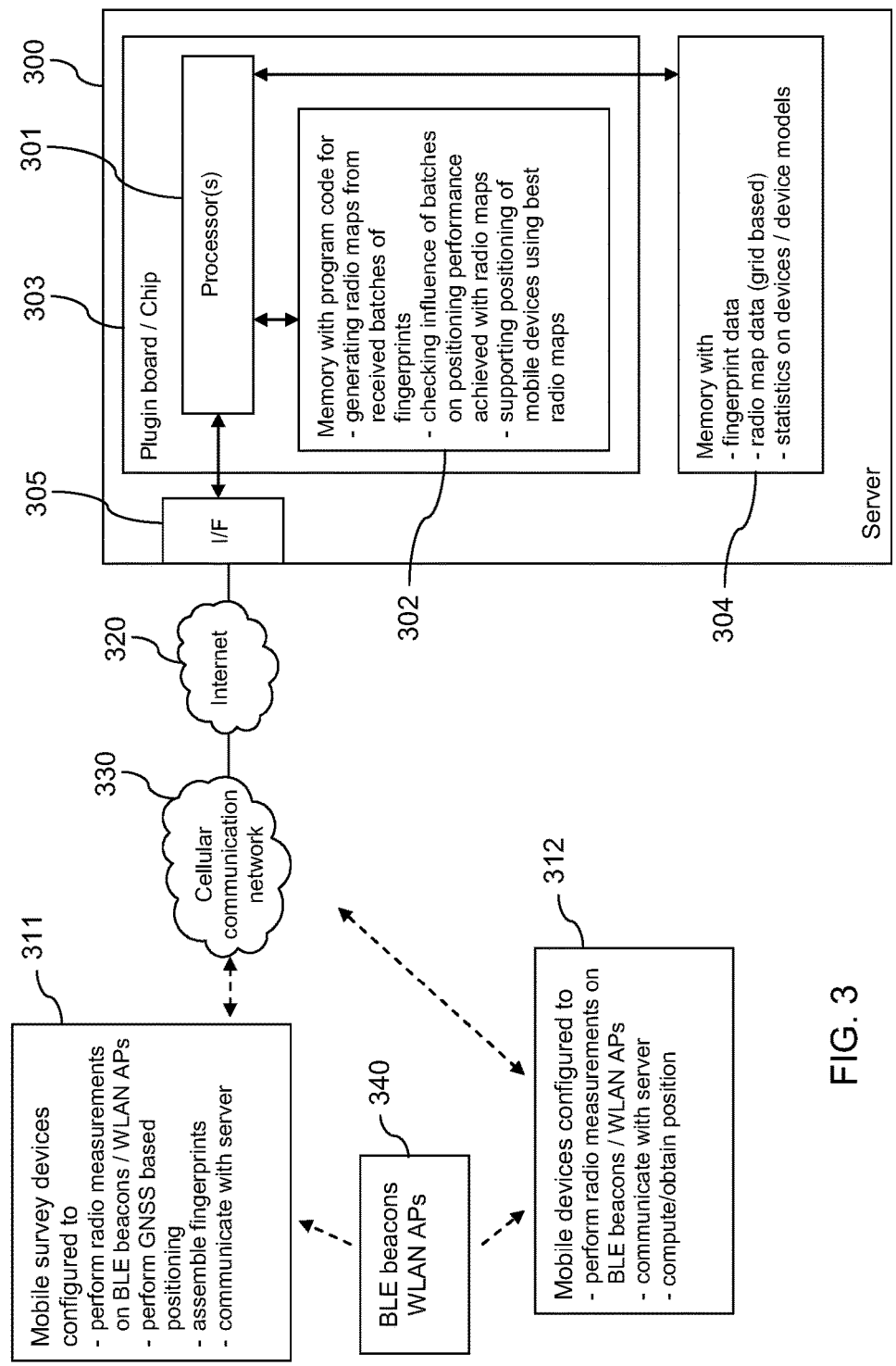
FIG. 3 is a schematic block diagram of an example embodiment of a system.

FIG. 3 is a schematic block diagram of an example embodiment of a system supporting an improvement of a positioning performance.

The system comprises a server 300, mobile survey devices 311, mobile user devices 312 that may desire to know their own position, and a plurality of beacons 340.

Server 300 may be for instance a dedicated location server or a general purpose server. It may be provided for supporting a positioning at a particular localization site or for supporting a positioning at a plurality of localization sites. Server 300 comprises a processor 301 that is linked to a first memory 302, to a second memory 304, and to an interface 305.

Processor 301 is configured to execute computer program code, including computer program code stored in memory 302, in order to cause server 300 to perform desired actions. It is to be understood that processor 301 may comprise or have access to a working memory for this purpose, for example in the form of a random access memory (not shown).

Memory 302 stores computer program code for generating radio maps from received batches of fingerprints and computer program code for checking the influence of batches on the positioning performance that may be achieved with different radio maps. All of this computer program code may belong for instance to a radio map generation application. Some of the program code in memory 302 may be similar to program code in memory 102. In addition, memory 302 may store computer program code configured to realize other functions, for instance computer program code for supporting a positioning of mobile devices by performing positioning computations for requesting mobile user devices 312 or by providing compressed radio map data to requesting mobile user devices 312, using in each case a radio map presumably enabling the best positioning performance for a respective localization site. Memory 302 may also store for instance an operating system for server 300. In addition, memory 302 may store any kind of data.

Processor 301 and memory 302 may optionally belong to a module 303, like a plug-in board or a chip or an integrated circuit or any other kind of processing circuitry, which may comprise in addition various other components, for instance a further processor or a further memory.

Memory 304 is configured to store data, including for example received fingerprint data, grid based radio map data, and values of statistics on devices and/or device models. In addition, memory 304 may also store any kind of data. It is to be understood that memory 304 could also be external to server 300.

Interface 305 is configured to enable a communication with other devices, for instance via the Internet 320.

It is to be understood that server 300 may comprise various other components, like a user interface.

Component 303 or server 300 may be an example embodiment of an apparatus of the first aspect of the invention.

Any of mobile survey devices 311 may be for instance a regular mobile terminal, like a smartphone or general purpose tablet PC, or a dedicated survey device. A mobile survey devices 311 is configured to perform measurements on signals transmitted by at least one type of beacons 340, to determine its own position, to assemble fingerprints and to access the Internet 320, for instance via a cellular communication network 330 or via a WLAN. A mobile survey device 311 may determine its position for instance using an integrated GNSS receiver or based on a user input. An integrated GNSS receiver may comprise any kind of global navigation satellite signal receiver, for example a GPS receiver and/or a GLONASS receiver and/or a GALILEO receiver. It may be configured to receive corresponding satellite signals and to determine the current position of a mobile survey device 311 based on the signals, possibly using provided assistance data. A mobile survey device 311 is configured to communicate with server 300 via the Internet 320. The user of a mobile survey device 311 may belong to special survey personnel or be any user who is willing to support the collection of positioning data.

Any of mobile user devices 312 may be for instance a regular mobile terminal, like a smartphone or general purpose tablet PC, or it may be for instance an Internet of Things (IoT) device, like a smart watch or a smart band, etc. It is configured to perform measurements on signals transmitted by at least one type of beacons 340, and to access the Internet 320, for instance via a cellular communication network 330 or a WLAN, in order to communicate with server 300. It is further configured to compute its own position or to obtain a computed position from server 300 upon request.

The beacons 340 may be for instance WLAN access points and/or BLE beacons. They are distributed at a localization site, by way of example in a large building like a shopping mall, such that at least one beacon may be observed at essentially each location of the localization site at which a positioning of mobile user devices 312 is to be supported.

Figure 4:
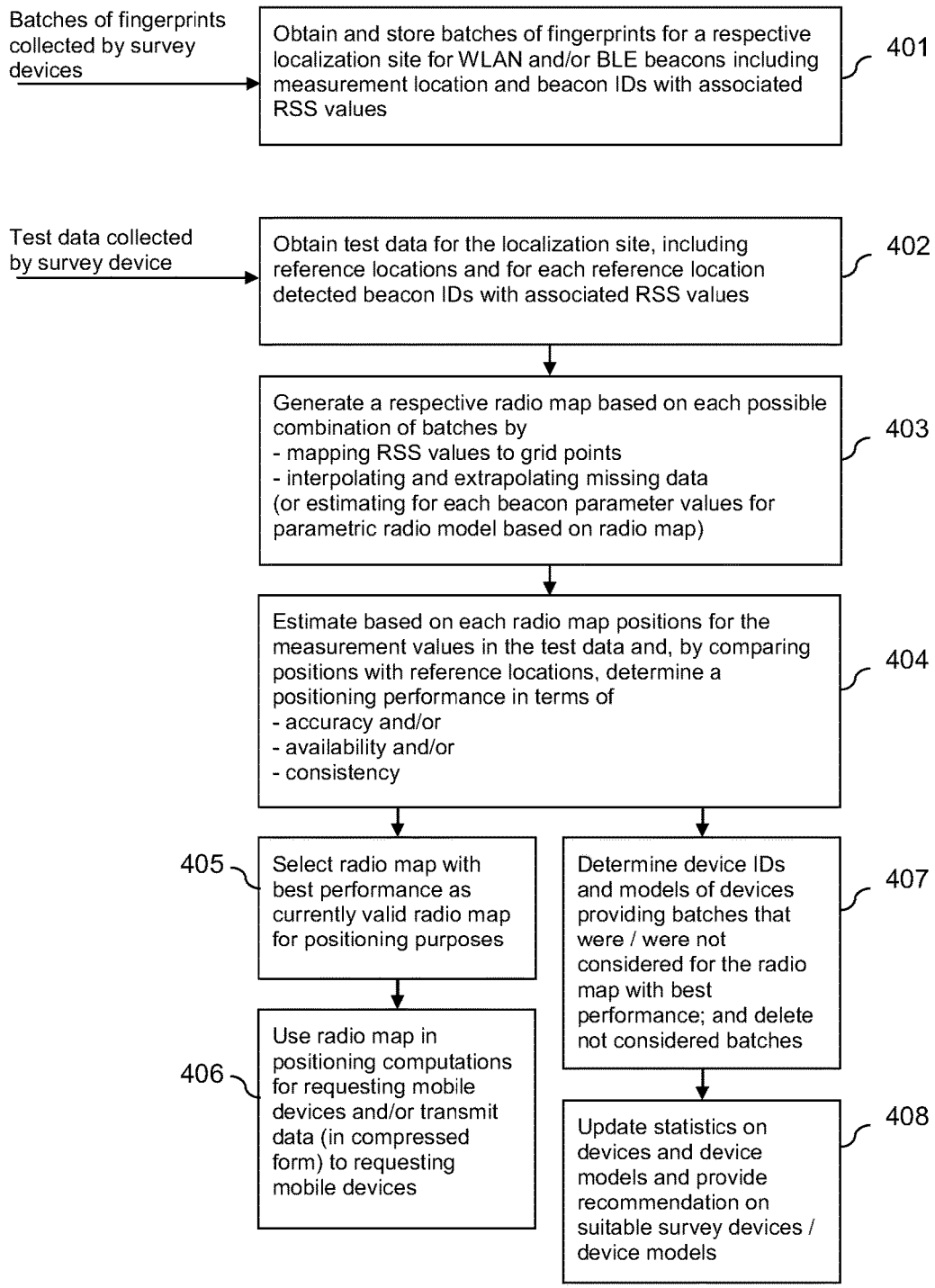
FIG. 4 is a flow chart illustrating a first example embodiment of a method in the system of FIG. 3.

FIG. 4 is a flow chart illustrating first example operations of server 300 in the system of FIG. 3. Processor 301 and some of the program code stored in memory 302 may cause server 300 to perform the presented actions when the program code is retrieved from memory 302 and executed by processor 301. The purpose of the operations of FIG. 4 is to generate an optimized radio map for a localization site. Sever 300 may perform corresponding actions separately for each of a plurality of localization sites.

Mobile survey devices 311 moving around at localization site scan for radio signals from beacons 340 in their environment at regular intervals. Whenever a device 311 detects at least one radio signal during a scan, it measures the received signal strength (RSS) of each radio signal and extracts an identifier of the transmitting beacon, e.g. a medium access control (MAC) address of a transmitting BLE beacon or WLAN access point, from the radio signal. The measured radio signal strength values may then be considered to be characteristics of the observed radio signals. In addition, mobile survey device 311 obtains an indication of its current position at each location at which measurements are performed during a scan. The user of device 311 may be required for example to enter information on a respective measurement location, for instance based on a grid covering the floor plan presented on a display of device 311. Alternatively, a GNSS receiver of device 311 may capture satellite signals and estimate the position of mobile survey device 311 at the same regular intervals in which scans for radio signals are performed, for example once per second. Since satellite signals may be difficult to receive within buildings, such a positioning may be an assisted GNSS (AGNSS) based positioning using available assistance data. The assistance data may be provided for example by some GNSS assistance server via cellular communication network 330. The indicated position may have a horizontal component, for instance a longitude value and a latitude value, or easting and northing values. In addition, it may have an indication of the floor on which the user is located. The indication of the floor may be obtained for instance in either case from a general input by the user when reaching a new floor. Alternatively, the position estimated by a GNSS receiver may include an altitude component, and the altitude may be mapped to a respective floor based on a reference altitude of the ground floor and some general or building specific information on the height of floors. It is to be understood that alternatively or in addition, other means may be used for determining the locations of measurements. The RSS values and the associated beacon IDs obtained during a scan as well as the obtained indication of the location of measurement (geo-referenced radio samples) are assembled as a fingerprint and stored in device 311 until the survey of the localization site has been completed for the time being. The fingerprints of various scans are then transmitted to server 300 as a batch of fingerprints along with an identifier of mobile survey device 311.

Server 300 receives batches of fingerprints from a plurality of mobile survey devices 311 for a localization site. Server 300 may receive several batches from a single mobile survey device 311, for instance in case the mobile survey device 311 provides separate batches per floor, or for instance in case the mobile survey device 311 performs repeated surveys at several occasions. This allows taking account of changes at the site, for instance in case additional beacons are deployed at the site. The batches are stored in memory 304. (action 401)

All batches for a localization site could now be used for generating a radio map for positioning purposes. However, the data in some of the batches may not be accurate and have a negative influence on the positioning performance.

Therefore, one of the mobile survey devices 311 is used in addition for collecting test data on a test track at the localization site. The test data may equally be a collection of geo-referenced radio samples. Mobile survey device 311 transmits the test data to server 300. A survey application running on mobile survey device 311 may provide a corresponding option for the collection and transmission of test data. The transmitted test data may be marked by the application as test data so that server 300 knows that this data is not to be used for the generation of the radio map for the localization site, but rather for quality assurance purposes.

Server 300 receives the test data for the localization site. The received test data includes a sequence of reference locations and for each reference location detected beacon IDs with associated RSS values. (action 402)

Server 300 now generates a respective grid based radio map based on each possible combination of fingerprint batches stored in memory 304 for the localization site. (action 403) The grid is defined to cover the localization site such that each grid point corresponds to a geographical location at the site. If the localization site comprises several floors, a separate grid may be defined for each floor, or a single three dimensional grid may be defined with one dimension for the different floors.

A radio map may be generated by mapping the RSS value(s) and the associated beacon ID(s) of each fingerprint to the grid point that corresponds to a geographical location that is closest to the measurement location indicated in the fingerprint. If there are several RSS values for the same beacon that would be mapped to the same grid pint, some kind of average value may be used, for instance the arithmetic mean or the median value. For grid points to which no RSS values could be mapped due to missing fingerprints from the corresponding areas at the localization site, RSS values may be generated by interpolating surrounding RSS values if possible, and by extrapolating neighboring RSS values otherwise. Alternatively, the original or mapped RSS values could be used for estimating for each beacon parameter values for a path loss model, and the pass loss model could then be used for mapping all or missing RSS values to grid points of the grid.

Next, server 300 may evaluate the positioning performance that may be achieved with each generated radio map. (action 404) To this end, it determines the route of the survey device providing the test data based on the RSS values and associated beacon IDs and a respective one of the radio maps. For each radio sample including RSS values and associated beacon IDs, a grid point of the considered radio map is determined that provides the best match with respect to mapped RSS values and associated beacon IDs. The best match may be determined for instance as the match that results in the minimum total difference (determined e.g. as the sum of absolute values or as Euclidian distance) between the RSS values measured for the beacons and the RRS values for these beacons mapped to the grid point of the grid of the radio map. The geographic locations corresponding to the determined grid points may then be compared to the reference locations in the test data, in order to determine a positioning performance. The positioning performance may be determined in terms of one or more criteria.

The positioning performance may depend for instance on the accuracy that is achieved. The accuracy may be the difference between the estimated positions and the reference locations, for instance in the form of the mean of the absolute values of the distances between each estimated position and the corresponding reference location.

The positioning performance may furthermore depend on the availability of the positioning. The availability may indicate in how many cases—as a relative value—a positioning estimate was obtained. For example, the best matching grid point may only be accepted as acceptable match in case the difference between the mapped RSS values and the RSS values in the considered radio sample falls short of a predetermined threshold value. Otherwise, obtaining a positioning estimate may be considered to have failed.

The positioning performance may furthermore depend on a consistency measure. The consistency may indicate how many of the reference locations of the test data—as a relative value—lie within an estimated uncertainty area for the estimated position.

A final positioning performance that is estimated for a respective radio map may be for instance a weighted sum of these three criteria.

Server 300 now selects the radio map that resulted in the best positioning performance for the test data. The selected radio map may be used as the currently valid radio map and the associated data may be stored in memory 304 for further use. The radio data may be further processed before storage, for example compressed. The data for all other radio maps generated in action 403 may be deleted. (action 405)

The stored radio map may now be used for positioning purposes. (action 406)

For instance, some application of a mobile user device 312 may have to know the position of mobile user device 312 at a particular localization site. Mobile user device 312 may scan for radio signals at its current position. Mobile user device 312 may assemble measured RSS values of detected beacon signals and the beacon IDs of the beacons 340 transmitting the detected beacon signals as a radio sample and transmit the radio sample in a message to server 300 along with a positioning request. Server 300 may then estimate the position of mobile user device 312 based on the received radio sample and the currently valid radio map for the localization site. Server 300 may transmit the estimated position to the requesting mobile user device 312. The estimated position may then be provided for use by the application of mobile user device 312 requesting the position. The application may present the estimated position for instance to a user of mobile user device 312 via a display. Alternatively, mobile user device 312 could request radio map data for a certain localization site from server 300, in order to be able to continuously estimate its position based on the received radio map data and on results of scans for radio signals at the localization site. In this case, server 300 could provide the data of the currently valid radio map for the localization site to the requesting mobile device 312.

In addition, server 300 may determine statistics based on the selection of a particular radio map as a valid radio map.

Server 300 may determine the mobile survey device IDs and/or the device models, which may be indicated in the device IDs, of all mobile survey devices 311 which provided batches of fingerprints that were not considered in the generation of the radio map that was determined in action 405 to result in the best positioning performance. It is to be understood that server 300 may also determine the mobile survey device IDs and/or the device models of all mobile survey devices 311 which provided batches of fingerprints that were considered in the generation of the radio map that was determined in action 405 to result in the best positioning performance. The batches of fingerprints that were not been considered may be deleted from memory 304. (action 407)

Server 300 may then update statistics on the devices and the device models. Values of such statistics may equally be stored in memory 304. Based on the statistics, server 300 may provide recommendations on suitable survey devices and/or suitable service device models for future surveys of localization sites. (action 408) If batches of fingerprints from devices of a certain device model are discarded more often than batches from other devices, this may be an indication of low-performing hardware and/or software implemented in a certain model. The statistical evaluation, in particular the statistical evaluation of device models, may not be limited to a particular localization site.

The operations presented in actions 402 to 408 may be repeated whenever the radio map is to be updated based on at least one newly received and stored batch of fingerprints. Such updates may be useful, in case the initial fingerprint data was sparse, but also to take account of changes in the arrangement of beacons 340 or of changes in the radio environment due to construction measures, like relocation of internal walls, etc.

The number of radio maps N that are generated in action 403 is $$N = \sum_{k=1}^{n} \frac{n!}{k!(n-k)!},$$

where n is the available number of batches of fingerprints for a localization site. To provide a simple example, in case there are four batches of fingerprints, radio maps are created for subsets containing 4, 3, 2 and 1 batches. The number of subsets is as follows:

4 batches: 4!/(4!*(4-4)!)=1 subset
3 batches: 4!/(3!*(4-3)!)=4 subsets
2 batches: 4!/(2!*(4-2)!)=6 subsets
1 batch: 4!/(1!*(4-1)!)=4 subsets Thus, for four batches, there is already a total of 15 subsets to be considered, meaning that 15 different radio maps have to be generated in action 403 and to be tested in actions 404 and 405.

While the approach may find the optimal subset of batches of fingerprints to be used for the final radio map, the amount of combinations to test may be significant. If the required processing power and/or processing time is to be reduced, a somewhat simplified approach, for instance a recursive approach, may be used, which may still provide satisfactory results.

Figure 5:
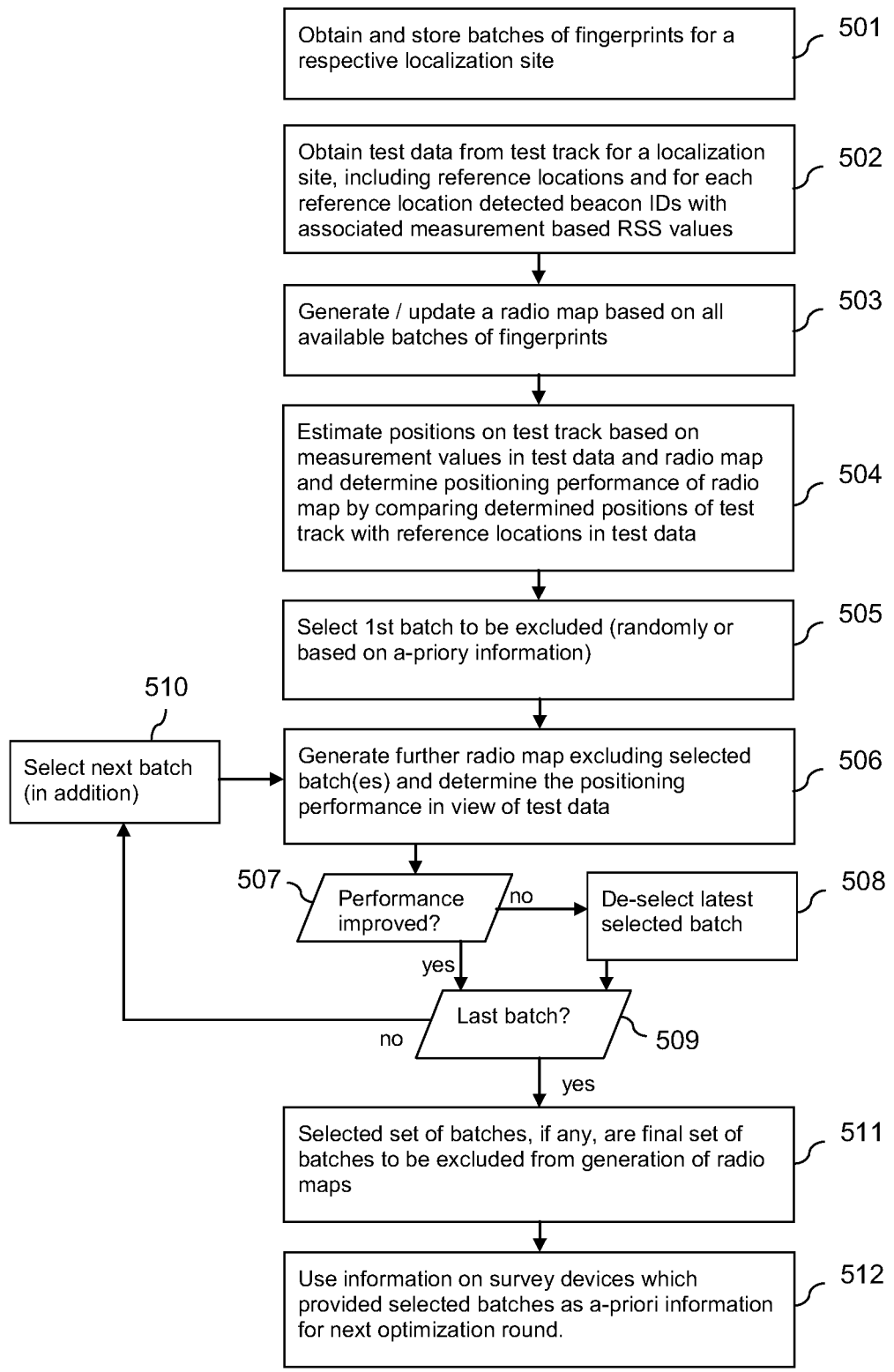
FIG. 5 is a flow chart illustrating a second example embodiment of a method in the system of FIG. 3.

FIG. 5 is a flow chart illustrating second example operations of server 300 in the system of FIG. 3. Processor 301 and some of the program code stored in memory 302 may cause server 300 to perform the presented actions when the program code is retrieved from memory 302 and executed by processor 301. The purpose of the operations of FIG. 5 is to determine a radio map of high quality for the localization site using a simplified approach in order to improve a positioning performance. The program code is somewhat modified compared to the program code used for the operations of FIG. 4, but many of the operations are similar.

Server 300 receives again batches of fingerprints from a plurality of mobile survey devices 311 for a localization site, as described with reference to action 401 of FIG. 4. The batches are stored in memory 304. (action 501) In some cases, the batches may supplement previously stored batches for the localization site.

Server 300 moreover receives test data for the localization site, as described with reference to action 402 of FIG. 4. The test data includes again reference locations and for each reference location detected beacon IDs with associated RSS values. (action 502)

Server 300 generates a grid based radio map for the localization site based on all available batches of fingerprints for this localization site in memory 304. The radio map may be generated in the same manner as described with reference to action 403 of FIG. 4. If a radio map has already been generated before for the localization site, a new radio map may be generated based on data from old and new batches stored in memory 304. Alternatively, the previously generated radio map could only be updated using the data from the new batches. (action 503)

Server 300 now estimates positions on the test track based on measurement values in the test data and the generated or updated radio map. Server 300 furthermore determines the positioning performance that may be achieved with the radio map by comparing the estimated positions on the test track with the reference locations in the test data. (action 504) The positions on the test track may be estimated again by matching the RSS values in the test data with the RSS values mapped to the grid points of the grid(s) of the radio map. This may be similar to the estimation of positions using one of the radio maps in action 404 of FIG. 4. The positioning performance may be determined again in terms of accuracy, availability and/or consistency, as in action 404 of FIG. 4.

Next, server 300 selects a first batch of fingerprints that is to be excluded from the generation of a further radio map. This first batch may be selected randomly or based on a priori information, as will be described further below. (action 505)

Server 300 now generates a further radio map based on the same batches as before, but excluding the selected first batch. Sever 300 furthermore determines the positioning performance that may be achieved with this further radio map based on the test data. (action 506)

Sever 300 compares the positioning performance determined in action 504 to be achievable with the first radio map that is based on all available batches of fingerprints and the positioning performance determined in action 506 to be achievable with the further radio map that is based on the batches of fingerprints with one batch excluded. (action 507)

In case the positioning performance is not improved, server 300 de-selects the selected batch again. (action 508) Otherwise, the previously selected batch remains selected.

In case the previously selected batch of fingerprints was not the last batch of all available batches that has not been selected so far (action 509), server 300 selects the next batch of fingerprints. (action 510) In case the previously selected batch has not been de-selected again in action 508, the next batch is selected in addition. Again, the selection may be random or based on a priori knowledge.

Sever 300 now continues with action 506. It generates a further radio map excluding all batches that have been selected so far and not de-selected again. In addition, it determines the positioning performance that can be achieved with this further radio map in view of the test data.

Sever 300 determines whether the positioning performance that can be achieved with the latest generated radio map is improved compared to the best positioning performance that has been achieved so far. (action 507)

This process including actions 506-510 continues, until it is determined in action 509 that there is no further available batch that has not yet been selected. That is, it is checked for one batch after the other whether it can be assumed to degrade the positioning performance, and such batches remain selected. It is to be understood that it is not required to check each batch. For instance, in the case of a large number of batches, it may be preferred to check only a predetermined (absolute or relative) number of batches at random, or only a certain number of batches per mobile survey device 311 or only a certain number per mobile survey device model.

Then, server 300 determines all selected batches that have not been de-selected again. These batches are considered a final set of batches that are to be excluded permanently from the generation of radio maps for positioning purposes. (action 511) The radio map that has been determined in the last iteration of actions 506-510 to result in the better positioning performance in action 507 is used as currently valid radio map. This map may be used for positioning purposes, as described with reference to action 406 of FIG. 4.

The selected batches may also be evaluated to obtain a priori information for future optimization rounds. It may be determined, for instance, which mobile survey devices 311 provided a batch that belongs to the final set of selected batches. (action 512) Batches received from these mobile survey devices 311 in a subsequent action 501 may be selected first in subsequent actions 505 and 510 of further optimization rounds. Furthermore, collected statistics on models of mobile survey devices which provide batches that are excluded permanently from further use may be used again for providing recommendations which models should or should not be used for future surveys. Alternatively, only batches provided by mobile survey devices 311 of models that provide unsuitable batches more often than others may be selected on a general basis in actions 505 and 510. Batches from devices of other device models may only be selected randomly to a limited extend.

The batches of the final set of selected batches may be deleted from memory 304.

Mobile devices providing batches of fingerprint and test data may be implemented in various ways. They may be or comprise an example embodiment of an apparatus according to the second aspect of the invention.

Figure 6:
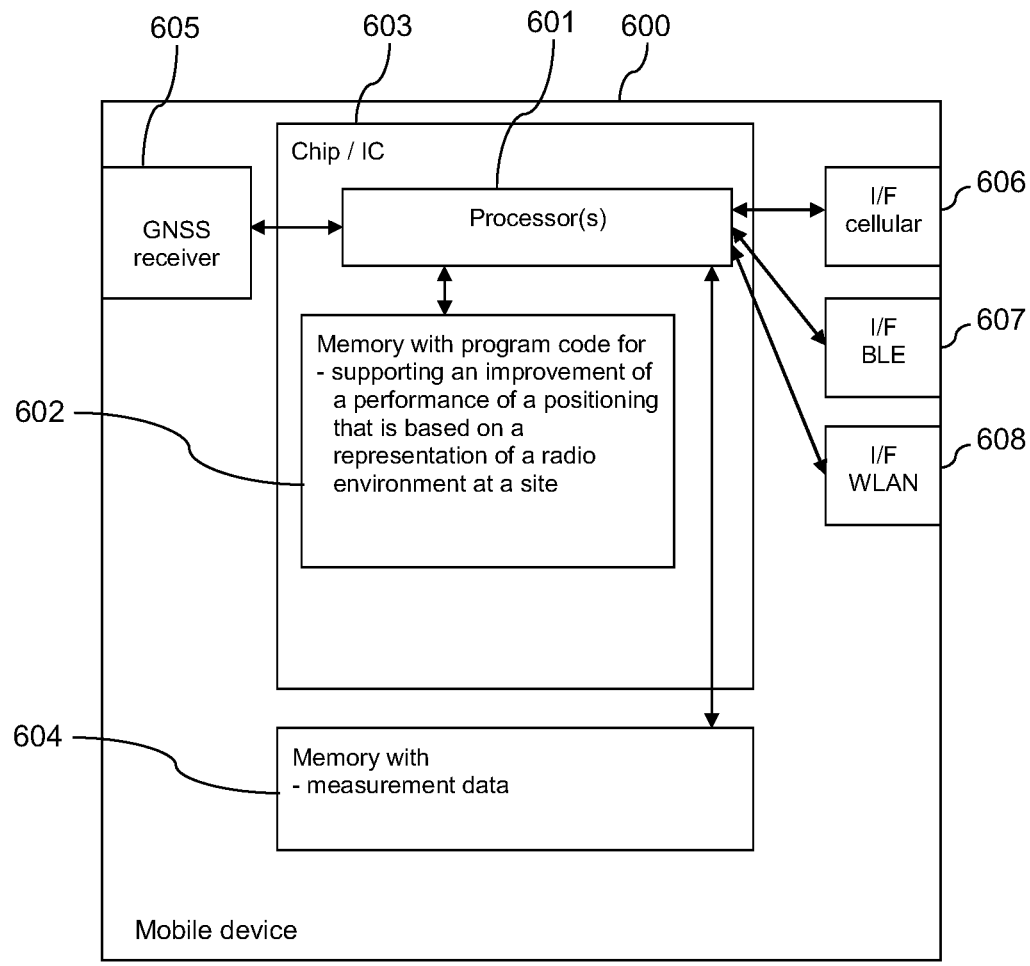
FIG. 6 is a schematic block diagram of an example embodiment of an apparatus according to the second aspect.

FIG. 6 is a schematic block diagram of an example embodiment of a mobile device 600 that may operate as a mobile survey device. Mobile device 600 comprises a processor 601 and, linked to processor 601, a memory 602. Memory 602 stores computer program code for improving a performance of a positioning that is based on a representation of a radio environment at a localization site. The computer program code may be for example computer program code according to the second aspect of the invention, and memory 602 may be an example computer readable medium according to the second aspect of the invention. Memory 602 may be a permanent or a volatile memory. Processor 601 is configured to execute computer program code stored in memory 602 in order to cause an apparatus to perform desired actions. Mobile device 600 may also comprise for example a further memory 604 enabling a storage of measurement data and other data, a GNSS receiver enabling a satellite signal based positioning of mobile survey device 600, an interface enabling communications via a cellular communication network, a BLE interface enabling a detection of BLE signals and optionally a communication with BLE beacons, and/or a WLAN interface enabling a detection of WLAN signals and optionally a communication with WLAN beacons. Alternatively or in addition, it may also comprise interfaces for other types of beacons. Optionally, mobile device 600 may comprise various other components, like a user interface, a further memory, a further processor, etc. Mobile device 600 or a module 603 for a mobile device 600, for instance a chip, circuitry or integrated circuit comprising processor 601 and memory 602, may be an example apparatus according to the second aspect of the invention.

Figure 7:
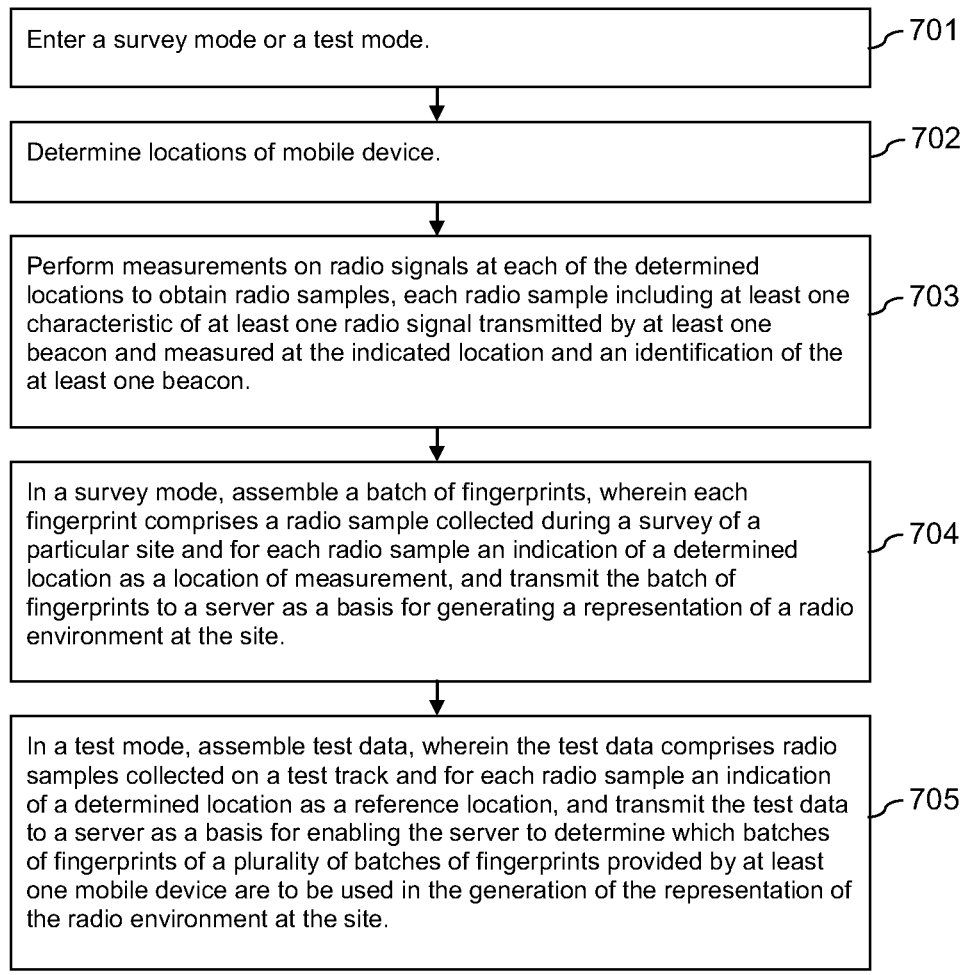
FIG. 7 is a flow chart illustrating an example embodiment of a method according to the second aspect.

An example operation of module 603 will now be described with reference to the flow chart of FIG. 7. The operation is an example embodiment of a method according to the second aspect of the invention. Processor 601 and the program code stored in memory 602 cause mobile device 600 to perform the operation when program code is retrieved from memory 602 and executed by processor 601.

Mobile device 600 enters a survey mode or a test mode. (action 701) The mode may be entered for instance based on a user input that is detected by mobile device 600.

Mobile device 600 furthermore determines locations of mobile device 600. (action 702)

Mobile device 600 furthermore performs measurements on radio signals at each of the determined locations to obtain radio samples, each radio sample including at least one characteristic of at least one radio signal transmitted by at least one beacon and measured at the indicated location and an identification of the at least one beacon. (action 703)

In the survey mode, mobile device 600 furthermore assembles a batch of fingerprints, wherein each fingerprint comprises a radio sample collected during a survey of a particular site and for each radio sample an indication of a determined location as a location of measurement. Mobile device 600 transmits the batch of fingerprints to a server as a basis for generating a representation of a radio environment at the site. (action 704)

In the test mode, mobile device 600 furthermore assembles test data, wherein the test data comprises radio samples collected on a test track and for each radio sample an indication of a determined location as a reference location. Mobile device 600 transmits the test data to a server as a basis for enabling the server to determine which batches of fingerprints of a plurality of batches of fingerprints provided by at least one mobile device are to be used in the generation of the representation of the radio environment at the site. (action 705) The test data may be transmitted for instance along with an indication that the test data constitutes test data.

It is to be understood that the presented example systems, apparatuses and operations may be varied in many ways. The systems and apparatuses may be varied for instance by modifying, adding or omitting components. The operations may be varied for instance by modifying actions, by omitting actions and/or by adding actions. In addition, the order of actions may be modified.

For example, in an alternative embodiment, the order of actions 402 and 403 of FIG. 4 may be exchanged.

For example, in an alternative embodiment, a separate grid may be defined for each detected beacon of a site, instead of using a grid, in which RSS values of several beacons may be mapped to a grid point, as described with reference to action 403.

For example, in an alternative embodiment, a position on a test track may also be estimated by calculating likelihood values by matching the RSS values of at least one beacon of the test data associated with a reference location with the expected RSS values for the at least one beacon mapped to grid points of the radio map. Once the likelihood for different locations has been calculated, the position of a mobile device may be estimated, for example, as the location for which the likelihood achieves the maximum value.

For example, in an alternative embodiment, a set of radio models may be determined in action 403 as a representation of a radio environment instead of a radio map. In case a representation of a radio environment comprises parameter values of parametric radio models for each detected beacon, a position may be estimated by defining circles around beacon positions defined by the parameter values, the radius of each circle being computed using the radio model for the respective beacon and the received signal strength value measured for the respective beacon. The position may then be estimated to correspond to an intersection point of all circles.

For example, in an alternative embodiment, server 300 of FIG. 3 may not be configured to perform positioning computations for requesting mobile devices 312. Instead, it may provide the currently valid radio map data to some other server offering such a service, or enable such other server to access memory 304.

For example, in an alternative embodiment, the beacons may include for example other transmitters than BLE beacons or WLAN access points, for example regular Bluetooth transmitters or ultra-sound transmitters, etc.

For example, in an alternative embodiment, the location of measurement may be determined by mobile survey devices by other means than user input or GNSS based positioning, for instance using a WLAN based positioning.

Summarized, certain embodiments of the invention may provide for an automatic analysis of collected batches of fingerprints to enable a selection of batches of fingerprints for a localization site that may be assumed to result in a satisfactory positioning performance when used for generating a radio map or any other representation of the radio environment at the localization site. Certain embodiments of the invention may furthermore provide for automatically determining devices and/or device models that consistently provide worse quality fingerprints than other devices and/or device models. Such information may be used as a priori information for future optimizations of radio maps or other representations of a radio environment at a localization site or for providing recommendations to surveyors with respect to suitable mobile survey devices.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102, or processor 301 in combination with memory 302, or component 303 can also be viewed as means for obtaining test data collected on a test track at a particular site, the test data comprising a plurality of radio samples and for each radio sample an indication of a reference location, each radio sample including at least one characteristic of at least one radio signal transmitted by at least one beacon and measured by a mobile device at the indicated reference location and an identification of the at least one beacon; means for estimating for each of a plurality of representations of a radio environment for the particular site positions on the test track based on the plurality of radio samples of the test data and on the respective representation of the radio environment, wherein each of the plurality of representations of the radio environment has been generated based on a different selection of a plurality of batches of fingerprints, wherein each fingerprint comprises a radio sample and for each radio sample an indication of a location of measurement, and wherein each radio sample of a fingerprint includes at least one characteristic of at least one radio signal transmitted by at least one beacon and measured by a mobile device at the indicated location of measurement and an identification of the at least one beacon; means for determining for each of the plurality of representations of the radio environment a positioning performance by comparing the positions estimated for the respective representation of the radio environment with the reference locations; and means for determining, based on the determined positioning performances, whether one or more of the plurality of batches of fingerprints are to be excluded as a basis for a generation of representations of the radio environment for positioning purposes and/or selecting a representation of the radio environment resulting in a best positioning performance as a currently valid representation of the radio environment for the particular site.

The program codes in memory 102 and memory 302 can also be viewed as comprising such means in the form of functional modules.

The functions illustrated by processor 601 in combination with memory 602, or component 603 can also be viewed as means for causing a mobile device to enter a survey mode or a test mode; means for causing a mobile device to determine locations of a mobile device; means for causing a mobile device to perform measurements on radio signals at each of the determined locations to obtain radio samples, each radio sample including at least one characteristic of at least one radio signal transmitted by at least one beacon and measured at the indicated location and an identification of the at least one beacon; means for causing a mobile device to assemble, in a survey mode, a batch of fingerprints, wherein each fingerprint comprises a radio sample collected during a survey of a particular site and for each radio sample an indication of a determined location as a location of measurement, and to transmit the batch of fingerprints to a server as a basis for generating a representation of a radio environment at the site; and means for causing a mobile device to assemble, in a test mode, test data, wherein the test data comprises radio samples collected on a test track and for each radio sample an indication of a determined location as a reference location, and to transmit the test data to a server as a basis for enabling the server to determine which batches of fingerprints of a plurality of batches of fingerprints provided by at least one mobile device are to be used in the generation of the representation of a radio environment at the site.

The program code in memory 602 can also be viewed as comprising such means in the form of functional modules.

FIGS. 2, 4, 5 and 7 may also be understood to represent example functional blocks of computer program codes improving a positioning performance.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising:
   obtaining test data collected on a test track at a particular site, the test data comprising a plurality of radio samples and for each radio sample an indication of a reference location, each radio sample including at least one characteristic of at least one radio signal transmitted by at least one beacon and measured by a mobile device at the indicated reference location and an identification of the at least one beacon;
   estimating for each of a plurality of representations of a radio environment for the particular site positions on the test track based on the plurality of radio samples of the test data and on the respective representation of the radio environment, wherein each of the plurality of representations of the radio environment has been generated based on a different selection of a plurality of batches of fingerprints, wherein each fingerprint comprises a radio sample and for each radio sample an indication of a location of measurement, wherein each radio sample of a fingerprint includes at least one characteristic of at least one radio signal transmitted by at least one beacon and measured by the mobile device at the indicated location of measurement and an identification of the at least one beacon, wherein estimating positions on the test track comprises estimating first and second positions based on the plurality of radio samples of the test data and on first and second representations of the radio environment that has been generated based on first and second sets of batches of fingerprints, respectively, and wherein the first set comprises at least one batch that has been excluded from the second set;
   determining for each of the plurality of representations of the radio environment a positioning performance by comparing the positions estimated for the respective representation of the radio environment with the reference locations; and
   determining, based on the determined positioning performances, whether one or more of the plurality of batches of fingerprints are to be excluded as a basis for a generation of representations of the radio environment for positioning purposes and/or selecting a representation of the radio environment resulting in a best positioning performance as a currently valid representation of the radio environment for the particular site, wherein determining whether one or more of the plurality of batches of fingerprints are to be excluded comprises determining whether the positioning performance resulting with the second representation is improved compared to the positioning performance resulting with the first representation and, in an instance in which the positioning performance resulting with the second representation is improved compared to the positioning performance resulting with the first representation, excluding the at least one batch that has been excluded from the second set as a basis for a generation of representations of the radio environment for positioning purposes.

2. The method according to claim 1, wherein
   determining whether one or more of the plurality of batches of fingerprints are to be excluded as a basis for a generation of representations of the radio environment for positioning purposes and/or selecting a representation of the radio environment resulting in a best positioning performance as the currently valid representation of the radio environment further comprises, in case the positioning performance resulting with the second representation of the radio environment is determined to be improved compared to the positioning performance resulting with the first representation of the radio environment, excluding the first representation of the radio environment from being used as the currently valid representation of the radio environment.

3. The method according to claim 1, wherein the plurality of representations of the radio environment comprises representations of the radio environment that have been generated based on sets of batches,
   in which at least one batch of the plurality of batches has been excluded randomly and/or
   in which at least one batch of the plurality of batches has been excluded based on a priori knowledge.

4. The method according to claim 1, wherein a respective batch of fingerprints comprises fingerprints collected by a single mobile device.

5. The method according to claim 1, further comprising
   determining mobile devices that provided batches of fingerprints that are to be excluded from being used as a basis for generating representations of the radio environment for positioning purposes and/or that were not included as a basis for generating a representation of the radio environment selected as the currently valid representation of the radio environment for the particular site, and providing, based on the determination, a recommendation whether a mobile device is to be used for future collection of fingerprints and/or using information about the determined devices as a priori knowledge for subsequent generations of a plurality of representations of the radio environment based on a different selection of a plurality of batches of fingerprints; and/or
   determining device models of mobile devices providing batches of fingerprints that are to be excluded from being used as a basis for generating representations of the radio environment for positioning purposes and/or that were not included as a basis for generating a representation of the radio environment selected as the currently valid representation of the radio environment for the particular site, and providing, based on the determination, a recommendation whether a mobile device of a particular device model is to be used for future collection of fingerprints and/or using information about the determined device models as a priori knowledge for subsequent generations of a plurality of representations of the radio environment based on a different selection of a plurality of batches of fingerprints.

6. The method according to claim 1, wherein the positioning performance relates to an accuracy of the estimated positions for the test track; and/or an availability of estimated positions for the test track; and/or a consistency of estimated positions for the test track.

7. The method according to claim 1, wherein the at least one characteristic of a radio signal comprises an indication of a received signal strength of the radio signal.

8. The method according to claim 1, wherein the at least one beacon is at least one of:
   a wireless local area network access point; and/or
   a Bluetooth beacon; and/or
   a Bluetooth beacon enabling Bluetooth low energy mode; and/or
   a Bluetooth low energy beacon; and/or
   a base station of a cellular network.

9. An apparatus comprising at least one processor and at least one memory, wherein the at least one memory includes computer program code, the at least one memory and the computer program code configured to, with the at least one processor, cause a device at least to:
   obtain test data collected on a test track at a particular site, the test data comprising a plurality of radio samples and for each radio sample an indication of a reference location, each radio sample including at least one characteristic of at least one radio signal transmitted by at least one beacon and measured by a mobile device at the indicated reference location and an identification of the at least one beacon;
   estimate for each of a plurality of representations of a radio environment for the particular site positions on the test track based on the plurality of radio samples of the test data and on the respective representation of the radio environment, wherein each of the plurality of representations of the radio environment has been generated based on a different selection of a plurality of batches of fingerprints, wherein each fingerprint comprises a radio sample and for each radio sample an indication of a location of measurement, wherein each radio sample of a fingerprint includes at least one characteristic of at least one radio signal transmitted by at least one beacon and measured by the mobile device at the indicated location of measurement and an identification of the at least one beacon, wherein the positions on the test track are estimated by estimating first and second positions based on the plurality of radio samples of the test data and on first and second representations of the radio environment that has been generated based on first and second sets of batches of fingerprints, respectively, and wherein the first set comprises at least one batch that has been excluded from the second set;
   determine for each of the plurality of representations of the radio environment a positioning performance by comparing the positions estimated for the respective representation of the radio environment with the reference locations; and
   determine, based on the determined positioning performances, whether one or more of the plurality of batches of fingerprints are to be excluded as a basis for a generation of representations of the radio environment for positioning purposes and/or select a representation of the radio environment resulting in a best positioning performance as a currently valid representation of the radio environment for the particular site, wherein the device is caused to determine whether one or more of the plurality of batches of fingerprints are to be excluded by determining whether the positioning performance resulting with the second representation is improved compared to the positioning performance resulting with the first representation and, in an instance in which the positioning performance resulting with the second representation is improved compared to the positioning performance resulting with the first representation, excluding the at least one batch that has been excluded from the second set as a basis for a generation of representations of the radio environment for positioning purposes.

10. The apparatus according to claim 9, wherein determining whether one or more of the plurality of batches of fingerprints are to be excluded as a basis for a generation of representations of the radio environment for positioning purposes and/or selecting a representation of the radio environment resulting in a best positioning performance as the currently valid representation of the radio environment further comprises, in case the positioning performance resulting with the second representation of the radio environment is determined to be improved compared to the positioning performance resulting with the first representation of the radio environment, excluding the first representation of the radio environment from being used as the currently valid representation of the radio environment.

11. The apparatus according to claim 9, wherein the plurality of representations of the radio environment comprises representations of the radio environment that have been generated based on sets of batches,
   in which at least one batch of the plurality of batches has been excluded randomly and/or
   in which at least one batch of the plurality of batches has been excluded based on a priori knowledge.

12. The apparatus according to claim 9, wherein a respective batch of fingerprints comprises fingerprints that have been collected by a single mobile device.

13. The apparatus according to claim 9, wherein the at least one memory and the computer program code are configured to, with the at least one processor, cause the device to:
   determine mobile devices that provided batches of fingerprints that are to be excluded from being used as a basis for generating representations of the radio environment for positioning purposes and/or that were not included as a basis for generating a representation of the radio environment selected as the currently valid representation of the radio environment for the particular site, and provide, based on the determination, a recommendation whether a mobile device is to be used for future collection of fingerprints and/or use information about the determined devices as a priori knowledge for subsequent generations of a plurality of representations of the radio environment based on a different selection of a plurality of batches of fingerprints; and/or
   determine device models of mobile devices providing batches of fingerprints that are to be excluded from being used as a basis for generating representations of the radio environment for positioning purposes and/or that were not included as a basis for generating a representation of the radio environment selected as the currently valid representation of the radio environment for the particular site, and provide, based on the determination, a recommendation whether a mobile device of a particular device model is to be used for future collection of fingerprints and/or use information about the determined device models as a priori knowledge for subsequent generations of a plurality of representations of the radio environment based on a different selection of a plurality of batches of fingerprints.

14. The apparatus according to claim 9, wherein the positioning performance relates to
an accuracy of the estimated positions for the test track; and/or
an availability of estimated positions for the test track; and/or
a consistency of estimated positions for the test track.

15. The apparatus according to claim 9, wherein the at least one characteristic of a radio signal comprises an indication of a received signal strength of the radio signal.

16. The apparatus according to claim 9, wherein the at least one beacon is at least one of:
a wireless local area network access point; and/or
a Bluetooth beacon; and/or
a Bluetooth beacon enabling Bluetooth low energy mode; and/or
a Bluetooth low energy beacon; and/or
a base station of a cellular network.

17. The apparatus according to claim 9, wherein the apparatus is one of:
a module for a positioning support device;
a positioning support device;
a module for a server;
a server;
a module for a mobile device; and
a mobile device.

18. A non-transitory computer readable storage medium in which computer program code is stored, the computer program code causing a device to perform the following when executed by a processor:
obtain test data collected on a test track at a particular site, the test data comprising a plurality of radio samples and for each radio sample an indication of a reference location, each radio sample including at least one characteristic of at least one radio signal transmitted by at least one beacon and measured by a mobile device at the indicated reference location and an identification of the at least one beacon;
estimate for each of a plurality of representations of a radio environment for the particular site positions on the test track based on the plurality of radio samples of the test data and on the respective representation of the radio environment, wherein each of the plurality of representations of the radio environment has been generated based on a different selection of a plurality of batches of fingerprints, wherein each fingerprint comprises a radio sample and for each radio sample an indication of a location of measurement, wherein each radio sample of a fingerprint includes at least one characteristic of at least one radio signal transmitted by at least one beacon and measured by the mobile device at the indicated location of measurement and an identification of the at least one beacon, wherein the positions on the test track are estimated by estimating first and second positions based on the plurality of radio samples of the test data and on first and second representations of the radio environment that has been generated based on first and second sets of batches of fingerprints, respectively, and wherein the first set comprises at least one batch that has been excluded from the second set;
determine for each of the plurality of representations of the radio environment a positioning performance by comparing the positions estimated for the respective representation of the radio environment with the reference locations; and
determine, based on the determined positioning performances, whether one or more of the plurality of batches of fingerprints are to be excluded as a basis for a generation of representations of the radio environment for positioning purposes and/or select a representation of the radio environment resulting in a best positioning performance as a currently valid representation of the radio environment for the particular site, wherein the device is caused to determine whether one or more of the plurality of batches of fingerprints are to be excluded by determining whether the positioning performance resulting with the second representation is improved compared to the positioning performance resulting with the first representation and, in an instance in which the positioning performance resulting with the second representation is improved compared to the positioning performance resulting with the first representation, excluding the at least one batch that has been excluded from the second set as a basis for a generation of representations of the radio environment for positioning purposes.

* * * * *